Jan. 14, 1936.  H. T. DURANT ET AL  2,027,681
FILTER
Filed March 23, 1933  2 Sheets-Sheet 2
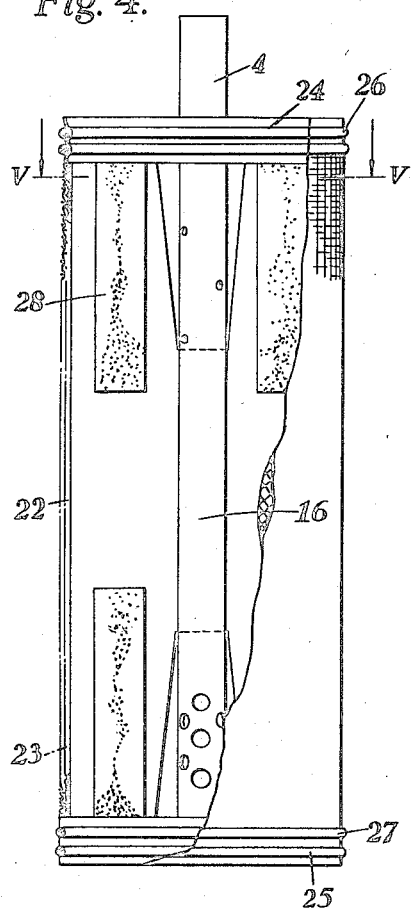
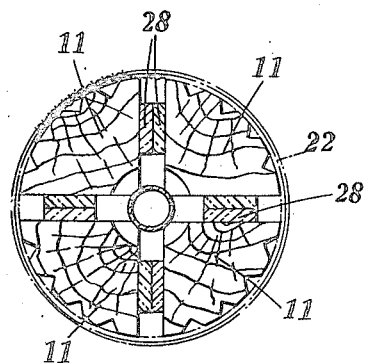
INVENTORS:
Henry Thomas Durant & Eric Owen Stubbings,
BY
ATTORNEY Patented Jan. 14, 1936

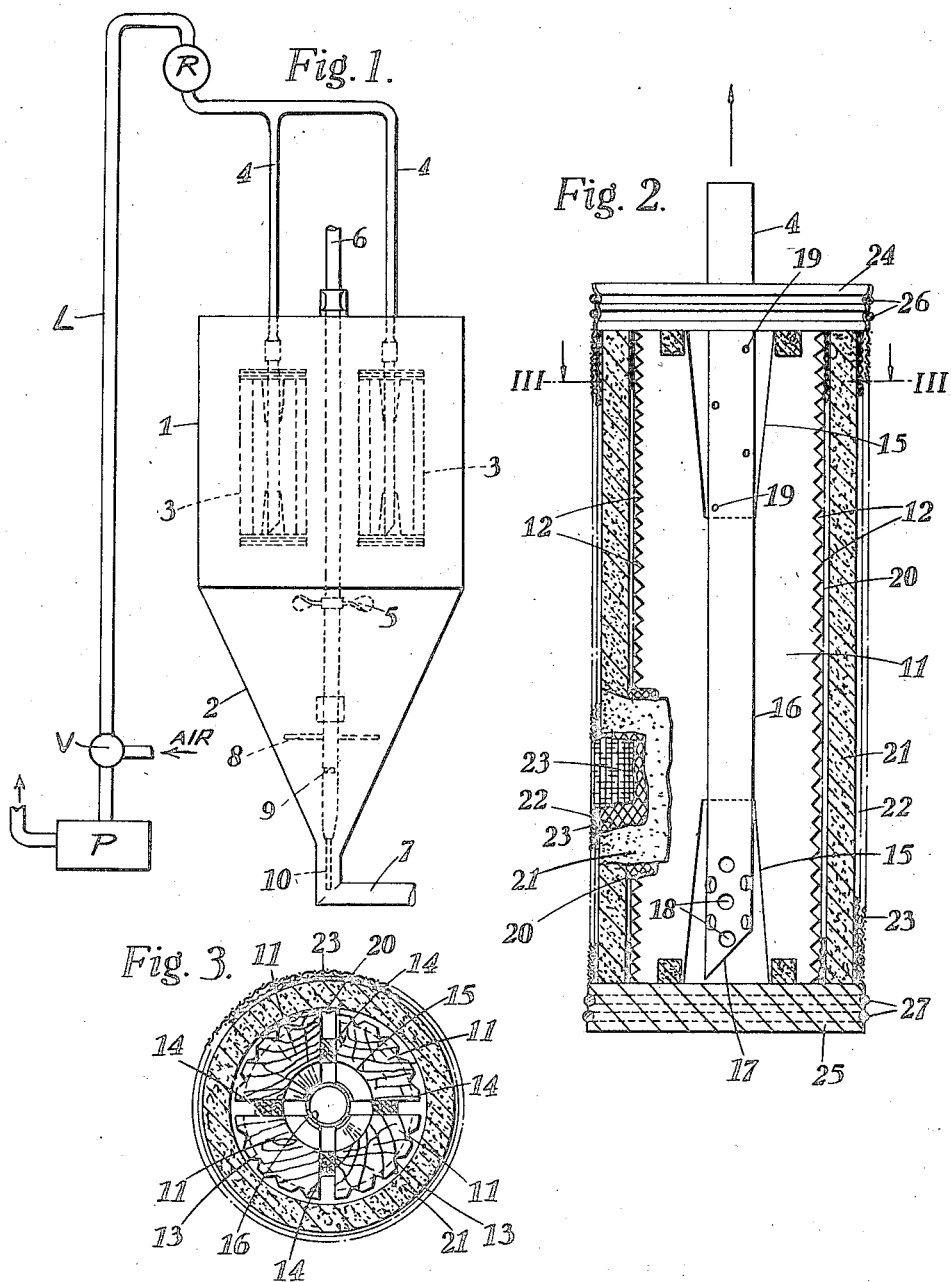

2,027,681

UNITED STATES PATENT OFFICE 2,027,681

FILTER

Henry Thomas Durant, Crawley, and Eric Owen Stubbings, Carshalton, England, assignors to Blomfield Engineering Company, Limited, London, England, a British company Application March 23, 1933, Serial No. 662,330
In Great Britain April 20, 1932

12 Claims. (Cl. 210—151)

This invention relates to filtering apparatus and more particularly to so-called thickening apparatus, such as is employed, for example in thickening slimes or sludges obtained in mining and other industrial processes. The invention is concerned with the apparatus for filtering such slimes and for forming a cake of the solid material in a homogeneous and satisfactory manner and also for removing or discharging the cake from the filtering elements.

It has been recognized already that in order to form a good cake and also to obtain good even washing of the cake subsequently, certain conditions should be observed as far as is commercially possible. First of all the percentage of solids in the material fed should be as high as practicable, as otherwise a thin layer of fine solids is liable to become bedded on the filter cloth in such a way as rapidly to render the layer impermeable, with the result that filtration on an economic basis soon comes to an end and the output expressed in terms of rate of formation of cake is low, or of production of filtrate which is equally important. The cake deposited on the filter cloth should be homogeneous in respect of the size of the particles deposited over the different portions of the filtering surface. Thus, if the coarser particles are allowed to sink and be deposited on the lower part of the filtering surface to form a thick cake there, the less permeable portions will be deposited at the upper part of the filtering surface and form a thin cake. The result is, a cake which is not uniform in its resistance to the flow of the liquid and which, therefore, cannot be washed uniformly. Moreover, the filter cloth would not be in a good condition for discharging the cake, nor for cleansing, nor for receiving the next cake. The main object of the present invention is to avoid these drawbacks, to enable a uniform cake to be formed and to enable the cake to be readily removed or discharged from the filter cloth when desired.

The invention therefore comprises a filtering apparatus furnished with one or more elements provided with a filter cloth or like filtering material which is carried or mounted upon a support which is resilient or elastic so as to be capable of yielding under a difference of pressure on its two sides, but also capable of elastic recovery when the pressures are equalized or reversed. This action is utilized for enabling the cake formed on the filter cloth or other material to be automatically discharged when desired under the surface of the water or other liquid in the feed material. The resilient yielding of the support and the resilient recovery causes the surface of the filter cloth to remain "alive" during the filtering and during the discharge of the filter cake. The result is that during filtering any bonds between the cake and the surface of the filter cloth are continuously broken up so that the cake is formed of open texture and does not tend to become impermeable and is consequently in a condition in which it can be more readily removed or discharged than would otherwise be the case. In addition, during the discharge of the cake, not only is the cake discharged very readily and easily, but when complete discharge has taken place, the surface of the filter cloth is in a remarkably good condition and surprisingly clean even when touched with the fingers; it is consequently in a particularly good condition for receiving the next filter cake. Such conditions cannot be obtained by other methods of discharge, such as, for example, applying a substantial pressure to the inside of a closed filter element and thereby ballooning or swelling out the filter cloth.

The discharge of the cake can be effected in a very efficient manner by exposing its surface, which was at the reduced pressure during filtering, to the action of water or other liquid which is at a comparatively small pressure above that on the opposite face. The result of this is that the water or other liquid can percolate or ooze slowly through the filter cloth without flowing through it to any great extent and thereby effect an efficient lubricating action on the surface of the cloth on which the cake is deposited assisting in the cake cleanly sliding off when these discharging conditions are set up. This lubricating effect is, of course, very effective when used in combination with the resilient action of an elastic support, in accordance with the present invention.

The one or more filtering elements having the characteristics above referred to may be mounted in a tank to which the feed material is supplied, and conveniently the difference in pressure may be set up by connecting the interior of the closed elements to a suction pump or other means of producing a reduction in pressure within the elements. The feed material undergoing filtration is constantly agitated by means of an agitator mechanism, such as a paddle or rotating blade which acts just to maintain the homogeneous condition of the pulp or mud forming the feed material, while at the same time leaving below the agitator mechanism a practically quiescent zone of thickened material containing the cake discharged from the filter element and which material may be discharged from the tank in any convenient manner. The thickened material at the bottom just above the discharge outlet may be broken up by cutters which may be carried on the same shaft as the agitator paddle. It is possible that the agitation may cause some of the cake deposited on the filtering surface to be removed or washed off; the extent to which this may happen is naturally proportional to the rate of movement of the feed material and to some degree, in inverse proportion to the difference in pressure on the two sides of the filtering surface. This removal or washing off of the cake is an advantage since as the liquid previously actually associated with it has already passed through the filtering surface there is no objection to all or any of the cake falling away if it can.

The tank may conveniently be of cylindrical shape in its upper part and of conical shape at the bottom and the agitating mechanism may comprise a small paddle or blade placed at the upper part of the conical well and carried on a vertical shaft which is continuously rotated at a slow rate which depends upon the diameter or cross-sectional area of the filter tank.

During the discharge of the cake, it is preferred to break the vacuum within the element and admit water at quite a low pressure to the inside, for example, at a head of say 12 inches of water. Apart from the improved removal of the cake in comparison with methods already proposed according to which considerable air or water pressure is applied to the inside of the filter element or elements, there is in accordance with the invention no danger of bursting the filter cloth and no need to wire up or fix the outside surface of the filter cloth, and as already mentioned, the filter cloth is kept remarkably clean because the resilient recovery of the support keeps the cloth "alive", or in other words, sets up a kind of rubbing action on the inside of the cloth at and during the time at which the pressures are equalized when there is a slight percolation of the clear liquid outwards through the cloth.

Although an example of the head of water which may be used to ensure this oozing of liquid through the cloth and the complete sliding off of the cake has been mentioned above, the head of water employed to obtain the best result naturally varies in the main with the extent of closeness of weave of the filter cloth. It is found, however, that the head required is usually so slight that commercially it would hardly be regarded as an internal pressure and the amount of clear liquid or water that actually oozes through the cloth is so small as to be practically negligible. If, owing to the use of more closely woven canvas or other cause, for example, the formation of a cake of almost colloidal consistency, a head larger than that mentioned above is used, no harm is done, but the percolation of liquid once started is naturally more rapid and the time allowed for this and the final discharge of the cake can be practically reduced to the minimum. Conveniently, this equalizing of the pressure and the slight positive pressure within the filtering element is produced without stopping or shutting off the suction pump, the suction side of the pump being connected to a supply of water or other liquid in excess of that which the pump can take up; with the result that the required excess of water supply and pressure is set up inside the filter element. A very simple form of mechanical valve control can then be used.

In order that the invention may be clearly understood and readily carried into effect, some examples of filtering apparatus in accordance with the present invention will be more fully described with reference to the accompanying drawings, in which:—

Figure 1 is a diagrammatic elevation of a filter tank containing two of the novel filter elements;

Figure 2 is a central sectional elevation to an enlarged scale of one form of the novel filtering element;

Figure 3 is a horizontal cross-section of the same on the line III—III in Figure 2;

Figure 4 is a view similar to Figure 2 of a modified form of construction; and

Figure 5 is a horizontal cross-section taken on the line V—V of Figure 4.

Referring first of all to Figure 1, a filter tank is shown, the upper portion 1 of which is cylindrical being about two feet in diameter and two feet in height. The lower part consists of a conical well 2. Two filter elements 3 are shown suspended in the tank to which the feed material is supplied over the upper edge at a rate controlled by any convenient means so that the level of the material in the tank is kept approximately constant. The interior of each of the elements 3 is connected by means of pipe 4 to a receiver R and thence by a pipe L to the intake of a suction pump P. With this state of affairs, the pressure inside the elements 3 is less than that outside, so that clear liquid is drawn through the filter cloth and led away through the pipe 4 and a cake of solid material is formed on the outer surface of the filter cloth. In order to ensure that this cake shall be deposited uniformly, an agitator, consisting of a paddle or blade 5 is provided carried on a vertical shaft 6, rotated at a comparatively low speed and at such a rate that the homogeneous character of the feed material in the tank 1 is just maintained. As seen from Figure 1, the paddle 5 is located near the top of the conical well 2 so that it does not disturb the material in the lower part of this well. The thickened material thus collecting at the lower part of the well 2 may be removed in any convenient manner, for example, through an outlet connection 7. The discharge may be controlled by a variable stroke pump or similar means so that the rate of discharge and therefore the density of the thickened pulp is under control. Two horizontal cutter blades 8 and 9 at right angles are provided to cut up and loosen the material gathering at the bottom and the intake to the connection 7 is kept clear, if necessary, by a square extension 10 of the shaft 6 projecting at the bottom into the intake to the connection 7.

One form of the filtering element is shown in detail in Figures 2 and 3. This has a core consisting of four segments 11 which, as illustrated, are made of wood but may be made of any other material possessing the necessary strength, such as ebonite or even hollow iron segments may be used when a material is being filtered which does not attack or corrode the iron. These core segments 11 are channelled circumferentially externally at 12 and also have longitudinal channels 13. Furthermore, the segments are slightly spaced apart, as illustrated, by small wedges 14 so that the decrease in pressure set up in the central space can be readily communicated to their outer surfaces. Of course, the segments need not be separated, but, in that event, they would be formed with radial through passages. Internally, the segments are bored conically at the top and bottom as shown at 15 and the suction pipe forming the continuation of the pipe 4 enters the inside of these segments and extends to the bottom. In order that the suction may be effective, the extended pipe 16 is cut away at the bottom or bevelled at 17 and at its lower part is formed with a number of apertures 18. In addition, there are a number of small holes 19 formed in the upper part of the pipe 16 to prevent the imprisonment of air at the top of the filter element or to prevent air collecting which may, for example, be boiled out of the liquid due to the reduced pressure. Immediately surrounding the core 11 is a thick layer of jute sacking 20 which serves to form a bedding for the next layer which consists of a cylindrical tube of spongy or porous India-rubber 21. The jute sacking 20 serves as a drainage member which facilitates the free and uninterrupted passage of the filtrate to the suction line of the pump P. The jute sacking may be replaced by any other material suitable for the purpose such as hessian, cocoanut matting or wire cloth. The tube 21 may be ⅝ of an inch in thickness and of the type of rubber which has pores or air spaces extending completely through it. This rubber can be obtained in a form which when subjected to a pressure of about two pounds per square inch experiences its maximum compression and in fact, is squeezed to about 20 to 25 per cent of its original thickness. Outside the rubber tube 21 is a further layer of jute sacking 22 and outside that again is the filter cloth or canvas 23. The top and bottom members of the filtering element consist of discs 24, 25. The disc 24 is rigid with the pipes 4 and 16 and forms practically a flange to those pipes and is formed with circumferential grooves. The filter cloth or canvas 23 is secured to the disc 24 by binding wires 26 which lie in the said grooves. The lower disc 25 is entirely supported by the fact that it is similarly wired by wires 27 to the filter cloth 23.

During the filtering operation if rubber of the kind referred to above is employed, as long as the difference in pressure between the inside and the outside of the element is at least two pounds per square inch, the spongy rubber tube 21 is contracted to about 20 to 25 per cent of its original thickness and the filter cloth is drawn in to remain bedded on the outer surface of the spongy rubber. In this state the cake or solid material is deposited on the outer surface of the filter cloth 23 and owing to the action of the agitator paddle 5 this cake is uniform and homogeneous. When the cake has formed to the desired economic thickness say, for example, to one inch, the valve or valves V controlling the pipe 4 are changed over so that a quantity of air is admitted to the suction line of pump P so as to break the vacuum and prevent pump P from drawing any more filtrate from the receiver R until the vacuum is again restored by returning the valve or valves V to the previous setting. The result is that then inside the element there is a supply of clear water under a head which is slightly greater than the pressure outside the element. The spongy rubber tube 21 recovers its normal dimensions pushing out the filter cloth 23 so that the cake on its outer surface is immediately stressed and considerable cracks are formed in it. A small amount of the water inside the element percolates or oozes through the filter cloth 23 by way of the passages in the core 11 and by way of the pores in the rubber tube 21 so that the outer surface of the filter cloth 23 is well lubricated and the whole of the cake formed slides off from the outer surface of the cloth 23 and drops to the bottom part of the well 2 from which it is carried away continuously or in batches as desired. As already mentioned not only is the cake thoroughly discharged, but owing to the rubbing action within the filter cloth 23 exerted mainly by the spongy rubber tube 21, the outer surface of the cloth 23 is cleansed to a remarkable degree and can be rubbed with the finger without the finger being appreciably soiled. The result is that the filter cloth 23 is maintained in a very good condition and is in a desirable state for the deposit of the next cake.

A somewhat modified form of filter element is shown in Figures 4 and 5. The construction is the same as in Figures 2 and 3 as far as the pipes 4 and 16 are concerned and in regard to the upper and lower discs 24 and 25 to which the filter cloth 23 is wired as before by wires 26 and 27. In this case the core consists of four segments 11 of wood rather larger than in the previous construction and formed with channels and passages as before between the filter cloth 23 and the core 11. In this case, however, there is only one layer of sacking 22. The elastic contraction and recovery is obtained in this case because the core segments 11 are maintained rather more widely spaced apart by means of strips 28 of the same kind of spongy rubber as employed in Figures 2 and 3, but in this case set radially between the segments 11. The action is precisely the same as described in connection with Figures 2 and 3 with the exception that the contraction and elastic recovery takes place to a rather less degree owing to the constructional difference, and the mode in which the spongy rubber strips 28 are employed.

Of course, as already indicated, other cushions than cushions of spongy rubber, such as the tube 21 or the strips 28, may be employed. Thus a tube consisting of a pneumatic cushion of the same general shape as the tube 21 and having a carefully calculated size may be employed or pneumatic cushions the same shape as the strips 28 may be used. In this case, however, the maximum contraction does not take place under a comparatively low difference of pressure, but the contraction is more gradual and sensibly takes place in proportion to the increase in the difference of pressure inside and outside the element.

Although some examples of apparatus which may be employed in accordance with the invention have been illustrated and described in detail, the invention is not, of course, limited to the particular forms shown and described. Thus, an additional effect of deformation of the filter cloth may be obtained by employing a cloth which itself can stretch, for example, a loose cloth having a backing of a thin sheet of india rubber suitably perforated or cut away to allow of the passage of liquid or by the use of cloth into which, for example, some india rubber strands are woven. A similar result may be obtained by incorporating one or more spiral or other springs in or under the filter cloth so as to give the deformation while filtering and the elastic recovery upon equalizing the pressure.

We claim:—

1. A filter element comprising a rigid core formed with passages to permit the flow of filtrate, a pipe mounted within said core and a pump in communication with said pipe for establishing a difference of pressure between the inside and outside of said element, a layer of sponge rubber mounted on said core, and a filter cloth surrounding said sponge rubber, the arrangement being such that when suction is applied by said pump the sponge rubber contracts, while when the pressures inside said core and outside said filter cloth are equalized said sponge rubber expands and forces said filter cloth outwardly, thereby loosening any bonds formed between said filter cloth and the filter cake formed thereon.

2. A filter element comprising in combination, a cylindrical core structure formed with passages to permit the flow of the filtrate and having circumferential and longitudinal channels in its outer surface, a layer of jute sacking enclosing said core structure, a tube of sponge rubber surrounding said jute sacking, a filter cloth enclosing said sponge rubber, circular discs mounted at the ends of said core structure and concentric therewith, said discs being formed with circumferential grooves, binding wires lying in said grooves and serving to secure said filter cloth to said discs, a pipe mounted centrally in said core structure and extending over substantially the whole length of said structure, and a pump connected to said pipe for reducing the pressure within the filter element.

3. A filter element comprising in combination, a cylindrical core structure formed of segments spaced apart to permit the flow of the filtrate, said segments having circumferential and longitudinal channels in their outer surface and being formed at each end with an internal conical bore, a pipe extending centrally through said core structure and provided at each end with a plurality of apertures, a layer of jute sacking enclosing said core structure, a tube of porous rubber surrounding said jute sacking, a filter cloth enclosing said porous rubber, circular discs mounted to close the ends of said core structure, said filter cloth being secured to said discs, and a pump connected to said pipe for establishing a difference of pressure between the internal and external faces of said filter cloth.

4. A filter element comprising in combination, a filtering medium, a resilient core structure supporting and surrounded by said filtering medium, a pipe mounted with said core structure, a pump connected to said pipe for establishing a difference of pressure between the inside and outside of said core structure, said core structure being formed of segments, and strips of sponge rubber arranged within said core structure serving to space apart said segments so as to enable changes of pressure set up within said core structure to be communicated to the outside of said structure and enabling said structure to yield when a difference of pressure is set up between its inside and outside and permitting elastic recovery of said structure when the pressures inside and outside are equalized.

5. A filter element comprising in combination, a filter cloth, a resilient core structure supporting and surrounded by said filter cloth, said core structure having longitudinal and circumferential channels formed in its external surface, a pipe mounted with said core structure, a pump connected to said pipe for establishing a difference of pressure between the inside and outside of said core structure, said core structure being formed of wooden segments, and strips of sponge rubber arranged within said core structure serving to space apart said segments so as to enable changes of pressure set up within said core structure to be communicated to the outside of said structure and enabling said structure to yield when a difference of pressure is set up between its inside and outside and permitting elastic recovery of said structure when the pressures inside and outside are equalized.

6. A filter element comprising in combination, a cylindrical core structure formed of wooden segments having longitudinal and circumferential channels in their external surfaces, strips of porous rubber arranged between said segments and serving to space apart the latter to provide passages for the filtrate, a layer of jute sacking enclosing said core structure, a tubular filter cloth surrounding said jute sacking, circular discs mounted to close the ends of said core structure, said filter cloth being secured to said discs, a pipe passing centrally through said core structure and having at each end a plurality of apertures, said pipe being arranged to fit tightly into one of said discs, and a pump connected to said pipe for establishing a difference of pressure between the internal and external faces of said filter cloth.

7. A filter element comprising in combination, a cylindrical core structure formed of wooden segments having longitudinal and circumferential channels in their external surfaces, strips of porous rubber arranged between said segments and serving to space apart the latter to provide passages for the filtrate, a layer of jute sacking enclosing said core structure, a tubular filter cloth surrounding said jute sacking, circular discs mounted to close the ends of said core structure, said discs being formed with circumferential grooves, binding wires adapted to lie in said grooves and to secure said filter cloth to said discs, a pipe passing centrally through said core structure and having at each end a plurality of apertures, and a pump connected to said pipe for establishing a difference of pressure between the internal and external faces of said filter cloth.

8. A filter element comprising in combination a rigid core formed with passages to permit the flow of filtrate, a drainage member enclosing said core, a tube of sponge rubber surrounding said drainage member, a filter cloth enclosing said sponge rubber, and means for establishing a difference of pressure between the interior and exterior of said element, the arrangement being such that during filtering said difference of pressure causes said sponge rubber to contract, and when the pressures inside and outside said element are equalized said sponge rubber expands so as to smooth the wrinkles from said filter cloth.

9. A filter element comprising in combination, a cylindrical core structure formed of segments spaced apart to permit the flow of filtrate, a cylinder of sponge rubber enclosing said core structure, a filter cloth surrounding said sponge rubber, and means for applying suction to the interior of said element thereby causing contraction of said sponge rubber during filtering, when, due to the resistance offered by the solids deposited on said filter cloth, the pressure outside is greater than the pressure inside said element, the arrangement being such that when the pressures inside and outside said element are equalized said sponge rubber expands against said filter cloth thereby loosening any bonds formed in the filter cake.

10. A filter element comprising in combination, a rigid cylindrical core formed of wooden segments spaced apart to permit passage of the filtrate, circular discs mounted on the ends of said core and concentric therewith, a tube of sponge rubber surrounding said core, a tubular filter cloth enclosing said sponge rubber, and means for establishing a difference of pressure between the inner and outer faces of said filter cloth, the arrangement being such that during filtering said difference of pressure causes said sponge rubber to contract, and when the pressures inside and outside said element are equalized said sponge rubber expands so as to smooth the wrinkles from said filter cloth.

11. A filter element comprising in combination, a cylindrical core structure formed of segments, strips of porous rubber arranged between said segments and serving to space apart the latter to provide passages for the filtrate, a tubular filter cloth surrounding said core structure, and means for establishing a difference of pressure between the internal and external faces of said filter cloth.

12. A filter element comprising the combination of a supporting structure contractile to a substantial extent under the working pressure and comprising a substantially cylindrical core formed with passages to permit the flow of filtrate and a cushion of sponge rubber associated with said core and supported thereby, with a filtering medium surrounding said core and sponge rubber, and means for establishing a difference of pressure between the interior and exterior of said core, the arrangement being such that during filtering said difference of pressure causes said sponge rubber to contract, while when the pressures inside said core and outside said filtering medium are equalized said sponge rubber expands and forces said filtering medium outwardly, thereby loosening any bonds formed between said filtering medium and the filter cake deposited thereon.

HENRY THOMAS DURANT.
ERIC OWEN STUBBINGS.